No. 751,649. PATENTED FEB. 9, 1904.
C. A. IVES.
FIRE ESCAPE.
APPLICATION FILED MAR. 21, 1903.
NO MODEL.
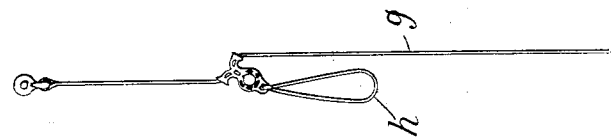
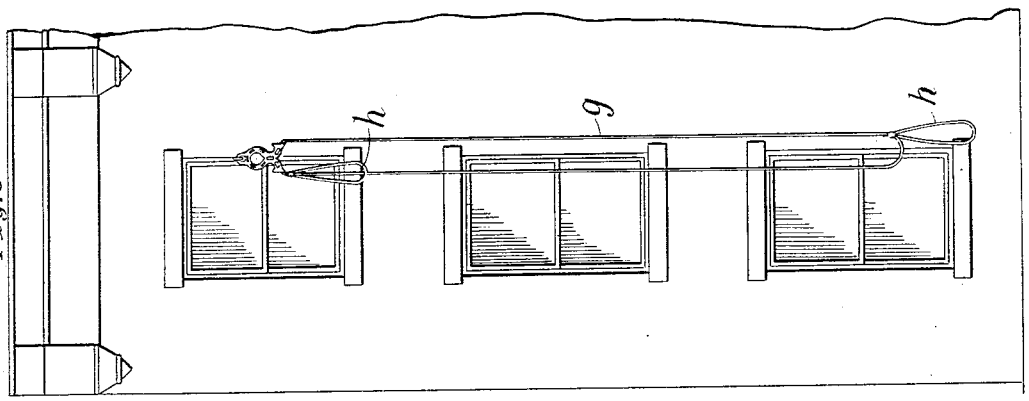
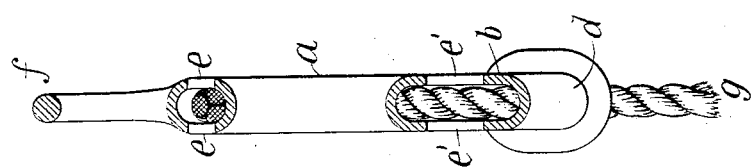
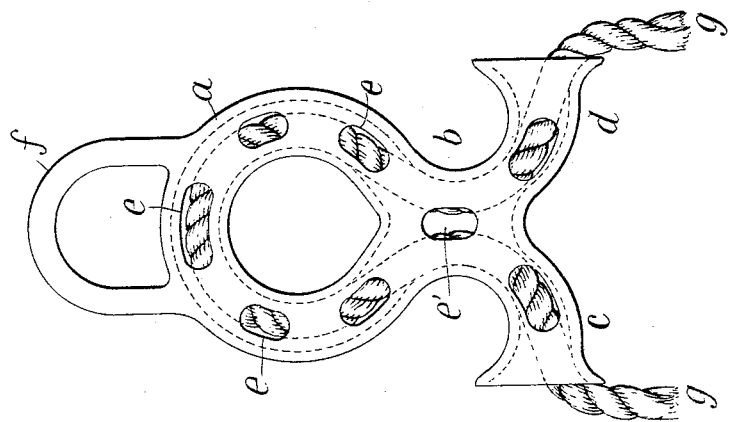
Witnesses:
Inventor
Charles A. Ives
by Henry D. Williams Att'y No. 751,649. Patented February 9, 1904.

UNITED STATES PATENT OFFICE.

CHARLES A. IVES, OF NEW YORK, N. Y.

FIRE-ESCAPE.

SPECIFICATION forming part of Letters Patent No. 751,649, dated February 9, 1904.

Application filed March 21, 1903. Serial No. 148,936. (No model.)

*To all whom it may concern:*

Be it known that I, CHARLES A. IVES, a citizen of the United States, résiding at the borough of the Bronx, in the city of New York, county of New York, and State of New York, have invented certain new and useful Improvements in Fire-Escapes, of which the following is a specification, reference being had therein to the accompanying drawings.

My invention relates to fire-escapes, and has for its objects simplicity of construction, lightness of weight, strength, cheapness, and inability to get out of order.

According to my invention the rope is inclosed in a friction device of tubular construction throughout, so that after the rope has been inserted therein it cannot be disarranged or entangled or put in such condition that it will fail to perform its functions when used, and this friction device comprises an annular tubular part and divergent tubular branches, and according to my invention the divergent tubular branches extend from the annular tubular part in reverse curves thereto, and means are provided for the inlet and circulation of air as a cooling medium within the tube to cool the parts under friction.

My invention includes various improvements in the construction and combination of parts, as hereinafter fully set forth.

I will now describe the fire-escape embodying my invention, illustrated in the accompanying drawings, and will thereafter point out my invention in claims.

Figure 1 is a side view of a friction device embodying my invention. Fig. 2 is a vertical central section of the same. Fig. 3 is a view of a fire-escape employing my invention in the nature of a pulley, and Fig. 4 is a partial view of a fire-escape employing my device as a carrier and descent-brake.

As shown in the drawings, my device comprises an annular tubular part $a$, embracing a coil of rope and conveying into a neck $b$, comprising an enlarged tubular portion arranged to embrace both strands of rope without binding, and my invention also comprises tubular branches $c\,d$, extending from the enlarged portion in reverse curves to the annular tube and provided with flaring or bell nozzles. The tubular parts of my device are provided with perforations or inlets $e\ e'$ for the ventilation of the parts under friction. These air-inlets also lighten the structure of my device by the removal of so much metal, and the inlet $e'$, which is located centrally in the enlarged tubular portion, may be employed to insert the finger to guide the rope. The annular tubular part is provided with an eye $f$, located in the same plane as the broadest dimension of the device, and has its point of suspension at right angles thereto, whereby the greatest frictional resistance and the greatest weight of metal are opposed to the greatest strain of the rope when in operation, so that the action of the rope is limited to the inner or outer periphery of the interior of the tubular part, and the rope is restrained from riding upon the perforated surfaces of the tube.

The rope $g$ is fed into one of the projecting divergent arms, as $c$, and brought up around within the annular tube $a$ and out through the other projecting arm $d$.

In Fig. 3 I have shown a complete fire-escape and have provided body-loops $h$ thereon hung on a loop of rope, the loop of rope passing through the friction device and the friction device hanging from the building in such a manner that as one body-loop descends the other ascends. In this device the whole fire-escape is supported by the friction device, and the function thereof is in the nature of a releasing-pulley. In Fig. 4 I have shown my friction device employed as a carrier for the body-loop and as a descending brake. It will be observed that in both of these devices the rope runs in the same plane although the device is completely reversed.

What I claim, and desire to secure by Letters Patent, is—

1. In a fire-escape, a friction device comprising an annular tube and tubular arms divergent therefrom in reverse curves, each of said tubular parts being provided with inlets in the tubular walls thereof at suitable intervals for a cooling medium.

2. In a fire-escape, a friction device comprising an annular tubular part adapted to receive a loop of the rope and inclose the same, a larger tubular part at one end of the annular tubular part adapted to receive and inclose both ends of such loop of the rope and two diverging tubular branches extending from such larger tubular part, each of such tubular branches adapted to receive one of the ends of such loop of rope.

3. In a fire-escape, a friction device comprising an annular tubular part, a larger tubular part at one end thereof and two diverging tubular branches, such larger tubular part and diverging tubular branches being curved reversely to the annular tubular part.

4. In a fire-escape, a friction device comprising an annular tubular part having an eye at one end thereof and a larger tubular part at the other end thereof and two diverging tubular branches extending from the larger tubular part.

5. In a fire-escape, a friction device comprising the annular tubular part $a$, the larger tubular part $b$ at one end thereof and the two diverging tubular branches $c$ and $d$, extending from the larger tubular part, the tubular parts having openings $e$, $e'$ and the larger tubular part and branches being curved reversely to the annular tubular part and each of the tubular branches having a flaring mouth.

6. In a fire-escape, a friction device comprising the annular tubular part $a$ and an eye $f$ located thereon, the larger tubular part $b$ at one end thereof and two diverging tubular branches $c$ and $d$, extending from the larger tubular part, the tubular parts having openings $e$, $e'$ and the larger tubular part and branches being curved reversely to the annular tubular part and each of the tubular branches having a flaring mouth.

In testimony whereof I have affixed my signature in presence of two witnesses.

CHARLES A. IVES.

Witnesses:
HERBERT H. GIBBS,
HENRY D. WILLIAMS.